(12) United States Patent
Cooper et al.

(10) Patent No.: US 10,352,813 B2
(45) Date of Patent: Jul. 16, 2019

(54) CALIBRATION OF AIRCRAFT INSTRUMENTS USING A LASER SENSOR

(71) Applicant: University Corporation for Atmospheric Research, Boulder, CO (US)

(72) Inventors: William A Cooper, Longmont, CO (US); Scott Spuler, Westminster, CO (US); Mike Spowart, Boulder, CO (US); Dirk Richter, Longmont, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 960 days.

(21) Appl. No.: 14/494,746

(22) Filed: Sep. 24, 2014

(65) Prior Publication Data

US 2015/0094976 A1    Apr. 2, 2015

Related U.S. Application Data

(60) Provisional application No. 61/884,233, filed on Sep. 30, 2013.

(51) Int. Cl.
*G01K 7/42* (2006.01)
*G01P 5/16* (2006.01)
*G01L 27/00* (2006.01)

(52) U.S. Cl.
CPC .............. *G01L 27/002* (2013.01); *G01K 7/42* (2013.01); *G01P 5/16* (2013.01)

(58) Field of Classification Search
CPC ...................................... G01L 27/002
USPC .......................................... 702/98
See application file for complete search history.

(56) References Cited

U.S. PATENT DOCUMENTS

| | | | | |
|---|---|---|---|---|
| 5,018,069 A | * | 5/1991 | Pettigrew | F02C 9/00 701/31.6 |
| 2012/0078540 A1 | * | 3/2012 | McIntyre | G01P 5/16 702/50 |
| 2013/0059518 A1 | * | 3/2013 | Biegemann | B64D 25/00 454/74 |

* cited by examiner

*Primary Examiner* — Marc Anthony Armand
(74) *Attorney, Agent, or Firm* — The Ollila Law Group LLC

(57) ABSTRACT

A method for correcting an ambient pressure measurement, a method for calculating a temperature, and an apparatus for affecting the same for an aircraft measuring system are provided. The methods include the steps of receiving an airspeed measurement from a laser sensor, receiving a total pressure measurement, and calculating an ambient pressure correction. A corrected ambient pressure or a calculated temperature may be calculated. The apparatus includes a laser sensor configured to provide an airspeed measurement, an aircraft instrument configured to provide a total pressure measurement, and a processing system.

18 Claims, 4 Drawing Sheets

CALIBRATION OF AIRCRAFT INSTRUMENTS USING A LASER SENSOR

CROSS-REFERENCE TO RELATED APPLICATION

This application claims priority from U.S. Provisional Patent Application No. 61/884,233, filed Sep. 30, 2014, entitled "Calibrating Measurements from a Research Aircraft Using a Doppler Laser Air-motion Sensor," the contents of which are incorporated herein by reference.

GOVERNMENT LICENSE RIGHTS

This Application was made with Government support under M0856145 awarded by the National Science Foundation. The Government has certain rights in this Application.

TECHNICAL FIELD

The present Application relates to aircraft instruments, and more particularly, to an improved method and apparatus for calibrating aircraft pressure and temperature instruments.

BACKGROUND OF THE APPLICATION

All aircraft have systems for measuring the pressure at the altitude of flight. Usually these are connected to openings called static ports, which are placed to minimize distortions caused by airflow around the airframe. Calibration of these systems is very important for operation of the aircraft because the altitude at which an airplane flies is determined from this pressure measurement. An incorrect pressure measurement may lead to an incorrect altitude and possible flight hazards. For this reason, aircraft manufacturers calibrate pressure-sensing systems accurately, often using a device called a trailing-cone system that trails a pressure sensing port behind the aircraft. Such systems are expensive to install, and their deployment in flight involves special precautions, however.

In order to safely fly an aircraft, a pilot must rely on accurate measurements of temperature, pressure, airspeed, humidity, and altitude. Accurate measurements are also very important in making scientific measurements via research aircraft. Many of the core measurements made from aircraft instruments are interconnected, however. For example, in measuring temperature, corrections may be made for dynamic heating caused by the motion of the aircraft. To measure airspeed, measurements of dynamic pressure, ambient pressure and temperature may be needed. Corrections may be further made to a measured pressure based on airspeed and/or orientation of the aircraft. Precisely measuring airspeed may depend on accurate knowledge of humidity, gas constants, and specific heats. Measurements of humidity by dew-point sensors may require correction for differences between ambient and sensor pressures. Because there are seldom standards or reliable references for any of these measurements, an analysis of uncertainty involves complicated and multi-dimensional examinations of measurement interactions and how flight conditions may influence measurements from otherwise carefully calibrated sensors.

It would be highly desirable to obtain a reliable reference in flight for any of the interlinked measurements to reduce measurement uncertainty. Trailing cones may be used to provide reliable measurements of pressure as aircraft airspeed, altitude and attitude angles change throughout a normal flight envelope. Disadvantages to a trailing cone include a need for a special and difficult installation, which may be particularly problematic for a pressurized aircraft flying at low pressure. Trailing cones are also not suitable for routine measurement.

Other prior methods include comparisons between aircraft. Research aircraft are often flown in formation to collect measurements, and if there are differences between those measurements it may be possible to determine which measurement is at fault. This method does not provide a reference measurement, however.

Other prior calibration methods include flight past towers with tethered balloon sensors, which may provide limited checks on the accuracy of measured pressures. These measurements are only possible at low altitude and low airspeed, however, and are not generally suited to the calibration of measurements in flight.

Other prior methods include ways to correct errors in measurements. For example, calibration has been possible via Global Positioning System (GPS) when the wind is known accurately by independent measurement. The aircraft drift measured with GPS may be compared to the expected drift, and the associated dynamic pressure may be corrected. Multiple measurements of pressure at ports around a spherical surface have also been used to determine the error in measured ambient pressure.

None of the prior methods provide a reliable airspeed measurement that may be used continuously and with a high degree of precision to correct ambient pressure, however. Nor do any of the previous methods provide a measure of temperature that is independent of the measure read directly from a temperature sensor. In addition, none of the prior airspeed measurement methods are valid both in clear air and during cloud penetrations. The present Application overcomes these and other problems and an advance in the art is achieved.

SUMMARY OF THE APPLICATION

A method for correcting an ambient pressure measurement outside an aircraft is provided. The method includes the steps of receiving an airspeed measurement from a laser sensor, receiving a total pressure measurement, and calculating an ambient pressure correction using the airspeed measurement and the total pressure measurement.

A method for calculating a calculated temperature outside an aircraft is provided. The method includes the steps of receiving an airspeed measurement from a laser sensor, receiving a total pressure measurement, calculating a corrected ambient pressure using the airspeed measurement from the laser sensor and the total pressure measurement from the aircraft instrument, and calculating the calculated temperature using the corrected ambient pressure, the total pressure measurement, and the airspeed measurement from the laser sensor.

An apparatus for calculating a calculated temperature in flight is provided. The apparatus includes a laser sensor configured to provide an airspeed measurement, an aircraft instrument configured to provide a total pressure measurement, and a processing system usable to calculate at least one of a corrected ambient pressure and a calculated temperature using the airspeed measurement, the total pressure measurement, and the corrected ambient pressure.

DETAILED DESCRIPTION OF THE APPLICATION

FIGS. 1-4 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1:
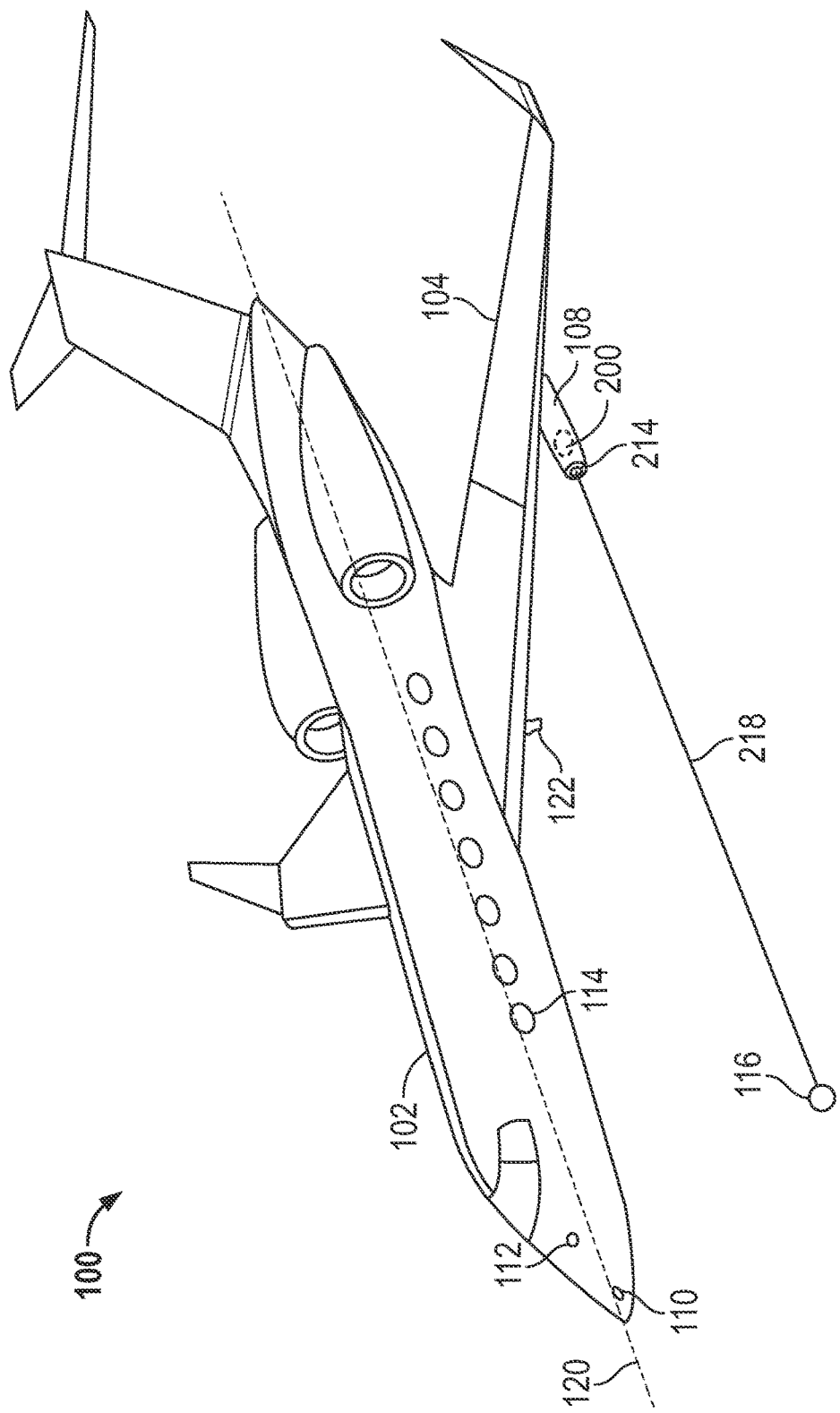
FIG. 1 depicts an aircraft measuring system 100, in accordance with an embodiment of the Application.

FIG. 1 depicts an aircraft measuring system 100, in accordance with an embodiment. Aircraft measuring system 100 includes an aircraft 102, a wing 104, and a wing pod 108.

Aircraft measuring system 100 includes instruments capable of making atmospheric measurements. For example, aircraft measuring system includes one or more pitot probes 110 and 112. Pitot probe 110 is positioned on the radome of aircraft 102, and pitot probe 112 is positioned on the fuselage of aircraft 102. Pitot probes 110 and 112, when combined with pressure transducers or other pressure sensing equipment, are capable of measuring dynamic and ambient pressures in the environment outside of aircraft 102. Aircraft measuring system 100 may further include static pressure port 114.

Aircraft measuring system 100 includes a temperature sensor 122. Temperature sensor 122 may be any type of temperature sensor suitable for measuring the temperature of air commonly known to those of skill in the art. While temperature sensor 122 is depicted as being placed on wing 104 in FIG. 1, temperature sensor 122 may be positioned anywhere on aircraft 102.

Aircraft measuring system 100 further includes a laser air-motion sensor 200 (LAMS) instrument inside wing pod 108. LAMS 200 may be used to measure airspeed outside of aircraft 102. In embodiments, LAMS 200 may be located in portions of the fuselage, the wing 104, or the wing pod 108 of aircraft 102. A window 214 of the LAMS 200 instrument may further be seen in FIG. 1. This is in no way intended to be limiting, however. In embodiments, portions of a LAMS 200 may be positioned on wing 104, wing pod 108, on the fuselage of aircraft 102, or in any other position that allows the LAMS to transmit beam 118 into the atmosphere and receive a backscattered signal. A laser beam 218 is transmitted through window 214 and includes a focal point 116 ahead of the wing pod 108. Laser beam 218 backscatters off aerosols in the atmosphere outside of aircraft 102 so that some portion of the backscattered light passes through window 214 a second time and is detected at LAMS 200.

In the embodiment of aircraft measuring system 100, it may be seen that aircraft 102 is a Gulfstream V. This is in no way intended to be limiting, however. Any aircraft may be used in aircraft measuring system 100, as will be readily understood by those of skill in the art.

Figure 2:
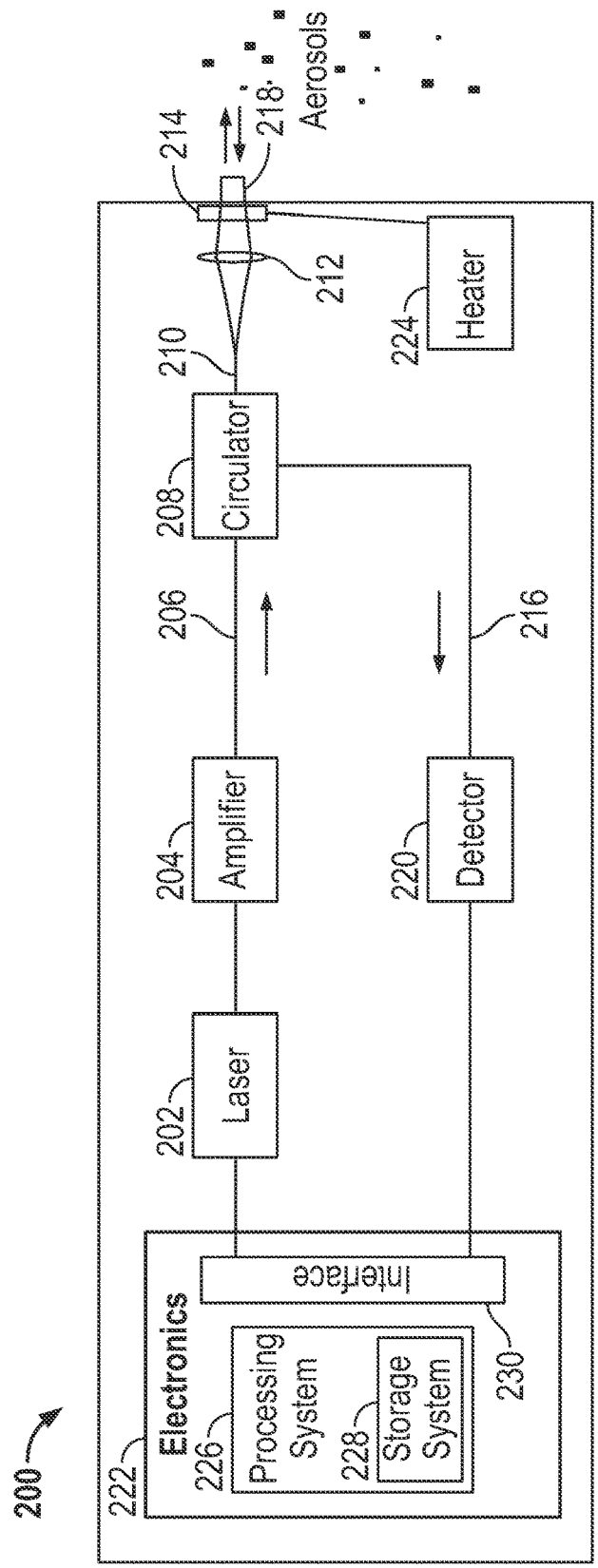
FIG. 2 depicts a block diagram 200 of an apparatus in accordance with an embodiment.

An example embodiment of LAMS 200 is detailed in FIG. 2, which depicts block diagram 200, in accordance with an embodiment. LAMS 200 is an instrument that uses a laser to measure the speed at which aerosols or particles are moving in a gas. As may be seen in the example embodiment of FIG. 2, LAMS 200 may include a laser 202, an amplifier 204, fiber optic cables 206, 210, 216, circulator 208, lens 212, window 214, laser beam 218, detector 220, and electronics 222. Laser 202 generates a beam, which enters amplifier 204 and passes into fiber optic cable 206. Upon passing into fiber optic circulator 208, the beam is transmitted into fiber optic cable 210, and exits as laser beam 218. Beam 218 passes through lens 212 and window 214 before passing into the atmosphere outside the window.

Lens 212 is configured to provide beam 218 with a focal point 116. It may be seen in FIG. 1, that the LAMS 200 laser beam 118 may be focused at focal distance 116 ahead of aircraft 102. In embodiments, focal distance 116 may be located in a part of the atmosphere undisturbed by aircraft 102.

In embodiments, LAMS 200 may be aligned to compensate for the normal angle-of-attack. For example, focal point 116 may be oriented to be substantially 3° downward relative to a longitudinal axis 120 of aircraft 102, as may be seen in the example aircraft measuring system 100 provided in FIG. 1.

In further embodiments, the focal distance 116 of the LAMS laser beam 108 may be set according to the type of aircraft 102 upon which it is mounted. For example, if aircraft 102 is a Gulfstream V (GV) the focal distance 116 may be 30 m ahead of the LAMS 200, or 16 m ahead of the nose of the aircraft 102. If aircraft 102 is a C-130, however, focal distance 116 may be 15 m ahead of the LAMS 200. The signal reflected back to LAMS 200 may be predominantly reflected from a volume extending approximately 2.5 m along the direction of flight, as given by the full-width-half-maximum distance of a telescope gain pattern.

In further embodiments, a small inertial system (not shown) may be mounted on wing pod 108 supporting a LAMS instrument to measure deviations in orientation caused by wing flex or other vibrations of wing pod 108 relative to the center axis of aircraft 102. The orientation of aircraft 102 may be further measured by a separate inertial reference system.

Returning to FIG. 2, it may be seen that a portion of beam 218 may be reflected or backscattered off aerosols or particles in the atmosphere, and the reflected portion of beam 218 may return to window 214. Upon passing through window 214 and lens 212, the reflected beam 218 may couple into fiber optic cable 210. Upon passing through circulator 208, the reflected beam may pass into fiber optic cable 216 to be received at a detector 220. From the Doppler shift detected in the backscattered laser light received at LAMS 200, the airspeed outside aircraft 102 may be determined.

In embodiments, LAMS 200 may operate laser 202 with a wavelength of approximately 1.56 µm. A concentration of particles of between 2 $cm^{-3}$ having a diameter in the range between 0.1-3.0 µm may backscatter laser beam 108 to provide a detectable signal at detector 220. The successful detection of backscattered signal from particles may be possible at altitudes from sea level up to 13 km. The Doppler shift in the backscattered signal received at LAMS may be used to determine an airspeed measurement v.

LAMS 200 may further include electronics 222. Electronics 222 may be any commercially available and well known computer or field-programmable gate array (FPGA) capable of performing the functions described herein, such as computers or FPGAs available from International Business Machines, Apple, Sun, HP, Dell, Cray, Xilinx, Altera, Lattice Semiconductor, Actel, SiliconBlue Technologies, Achronix, Quicklogic, etc.

Electronics 222 includes interface 230, processing system 226, and storage system 228. Electronics 222 may send or receive commands and telemetry relating to LAMS 200 via interface 230. Interface 230 may send or receive signals to any portion of LAMS 200 using any medium, wired or wireless, known of those of skill in the art. For example, interface 230 may send commands to and receive telemetry and signals from laser 202, detector 220, amplifier 204, circulator 208, and heater 224. Electronics 222 may further send or receive commands and telemetry to or from other aircraft instruments via interface 230. For example, electronics 222 may communicate with instruments that provide other independent atmospheric measurements.

Electronics 222 further includes one or more processing systems (e.g., central processing units (CPUs)), such as processing system 226. Processing system 226 may perform methods 300 and 400, any additional steps described herein with regards to methods 300 and 400, or any portion or combination thereof, though the scope of the embodiments is not limited in this respect.

Electronics 222 also includes a storage system 228, such as a random access memory, a hard disk drive, a solid state drive, or a removable storage device such as a memory card, a memory stick. Storage system 228 has stored therein control logic (computer software or code), and data. Storage system 228 may include control logic to perform methods 300 and 400, any additional steps described herein with regards to methods 300 and 400. Storage system 228 may further include data relating to methods 300 and 400. Processing system 226 reads from and/or writes to storage system 228 in a well-known manner.

A measurement of total pressure $p_t$ may be obtained by aircraft measuring system 100 by measuring the pressure delivered by pitot probe 110 or 112 that is approximately aligned with the airflow of aircraft 102. Total pressure $p_t$ may also be determined by adding a measurement of ambient pressure p and a measurement of dynamic pressure q. In embodiments, ambient pressure p may be measured using an absolute transducer (not pictured) connected static port 114 on the fuselage of aircraft 102. For example, using a Parascientific Model 1000 as an absolute transducer, it may be possible to measure ambient pressure p with an accuracy of 0.1 hPa. In embodiments dynamic pressure q may be measured by a differential sensor in communication with pitot tube 110 or 112 and static port 114. For example, using a Mensor Model 6100 as a differential sensor, it may be possible to measure dynamic pressure q with accuracy 0.02 hPa. In other embodiments, further combinations of pressure sensors may be used to generate any combination of measurements of total pressure $p_t$, ambient pressure p, and/or dynamic pressure q independent of a LAMS instrument.

Pitot probes are generally insensitive to small deviations from normal flow angles and are capable of delivering accurate total pressure $p_t$ within about 0.1% for flow angles up to three degrees from the centerline of the pitot probe. Static ports such as static port 114 may deliver pressures that depart much more from the true ambient pressure p at flight level when flow around the fuselage varies, however. Static ports may produce biases even at normal flight angles. Therefore, when using pitot probes 110, 112, and static port 114, ambient pressure p and dynamic pressure q generally have larger errors than the total pressure $p_t$.

In embodiments, LAMS 200 may be used to predict the dynamic pressure q. If p is the ambient pressure, $c_v$ the respective specific heat of air at constant volume, and $c_p$ the respective specific heat of air at constant pressure, T the absolute temperature, and Ra the gas constant for air, the Mach number $M=v/v_s$, or the ratio of airspeed measurement v to the speed of sound $v_s$, with $v_s=\sqrt{\gamma R_a T}$, and $\gamma=c_p/c_v$. Mach number M is given by the following equation:

$$M = \left\{ \left(\frac{2c_v}{R_a}\right)\left[\left(\frac{p+q}{p}\right)^{R_a/c_p} - 1\right] \right\}^{1/2} \quad (1)$$

Solving for the dynamic pressure q provides:

$$q = p\left\{ \left(\frac{v^2}{2c_p T} + 1\right)^{c_p/R_a} - 1 \right\} \quad (2)$$

It may therefore be seen that, with knowledge of ambient pressure p and absolute temperature T, LAMS 200 (measuring airspeed v) may provide an independent prediction of the dynamic pressure q. Furthermore, small errors in ambient pressure p and absolute temperature T will have a small effect on the deduced dynamic pressure q because expected errors are a small fraction of the total ambient pressure $p_t$ or the absolute temperature T.

In addition to providing an independent prediction of dynamic pressure q, LAMS 200 may also be used to correct measurements of dynamic pressure q made by other instruments. Comparisons examining redundant, independent measurements on a single aircraft have shown that the results for total pressure $p_t$ are remarkably consistent among redundant systems, agreeing to within 0.1 hPa. Significant variability may be found in the redundant measurements of both ambient pressure p and dynamic pressure q, however, often on the scale of a few hPa. It is therefore a good approximation to consider the total pressure measurement $p_t$ to be accurate and to assume that $\Delta q$, the dynamic pressure measurement error $q_m$, is equal to the negative of $\Delta p$, the ambient pressure measurement error $p_m$, because both arise from the "static defect" or error in the pressure present at the static source:

$$\Delta q = q_m - q = -\Delta p = -(p_m - p) \quad (3)$$

As a result, the dynamic pressure correction $q_c$ obtained from a LAMS may also provide an ambient pressure correction $p_c$, and these corrections may be applied simultaneously in Equation (3) using Equation (2):

$$\Delta q = q_m - p\chi(v,T)$$

where $\chi(v, T)$ is:

$$\chi(v, T) = \left(\frac{v^2}{2c_p T} + 1\right)^{c_p/R_a} - 1 \quad (4)$$

Therefore, because $p=p_m-\Delta p$:

$$p_c = -\Delta p = \frac{q_m - p_m \chi}{1 + \chi} \quad (5)$$

Equation (5) provides an ambient pressure correction $p_c$ in terms of the measurements of ambient pressure p and dynamic pressure q, the LAMS airspeed measurement v and the absolute temperature T. Equations (4) and (5) may be subsequently applied with measurements from the LAMS to estimate both the ambient pressure correction $p_c$ and, with reversed sign, the dynamic pressure correction $q_c$.

As may be seen from Equation (5), a measurement of absolute temperature T is required to calculate $\chi$. An independent temperature measurement T may be initially used. In embodiments, once pressure corrections are estimated, the accuracy of the independent temperature measurement may then be determined. Further iterations of the process may then be performed.

Figure 3:
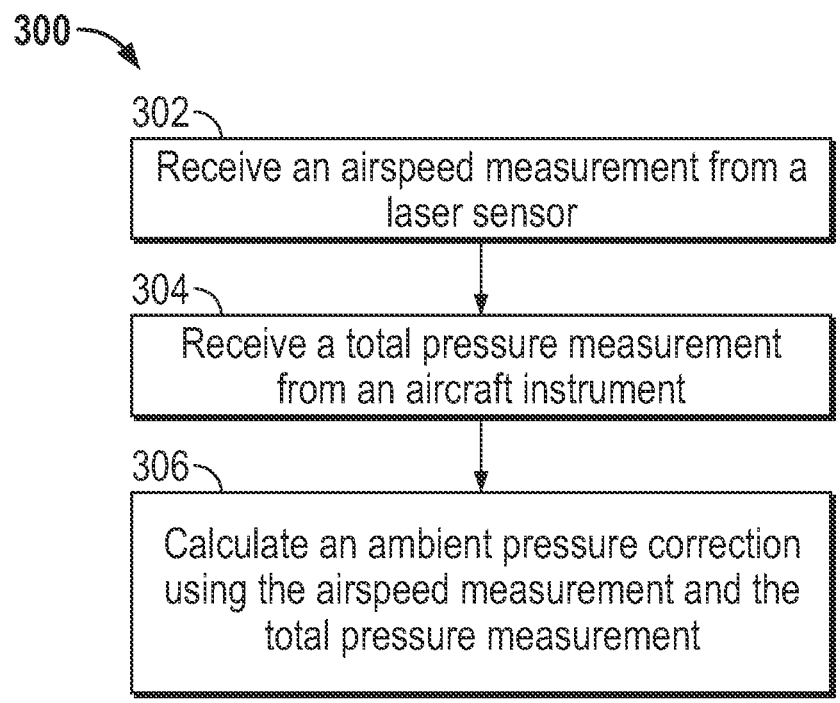
FIG. 3 depicts a method 300, in accordance with an embodiment of the Application.

FIG. 3 depicts a method 300 for correcting an ambient pressure measurement with an aircraft instrument, in accordance with an embodiment. The ambient pressure measurement may include a pressure measurement from any type of pressure measuring device commonly known to those in the art. For example, the ambient pressure measurement may be determined using a pitot probe and a pressure transducer, as described above.

Method 300 begins with step 302. In step 302, an airspeed measurement is received from a laser sensor. For example, airspeed measurement v may be received from LAMS 200, as described above.

Method 300 continues with step 304. In step 304, a total pressure measurement $p_t$ is received from an aircraft instrument. In embodiments, the total pressure measurement $p_t$ may be received from any type of instrument commonly known to those of skill in the art. For example, an aircraft instrument may include pitot probe 110 or 112 and a pressure transducer, as described above. In further embodiments, the total pressure measurement $p_t$ may be computed by combining ambient pressure p and dynamic pressure q measurements from one or more aircraft instruments.

Method 300 continues with step 306. In step 306, an ambient pressure correction $p_c$ is calculated using the airspeed measurement and the total pressure measurement. For example, Equations (4) and (5) may be used to determine an ambient pressure correction $p_c$ using the airspeed measurement v and the total pressure measurement $p_t$, as described above.

In embodiments additional steps may be performed in addition to those of method 300. For example, method 300 may further include calculating a corrected ambient pressure using the ambient pressure measured with the aircraft instrument and the ambient pressure correction. The corrected ambient pressure may be calculated by combining the ambient pressure correction $p_c$ and the ambient pressure measurement described above.

Those of skill in the art will readily understand that the pressure corrections described with Equations (4) and (5) are not intended to be limiting. In further embodiments, errors introduced into the ambient pressure correction $p_c$ and dynamic pressure correction $q_c$ calculated with a LAMS may be corrected. For example, humidity may have a small effect on thermodynamic properties such as the gas constant and specific heats. A moist air gas constant and a moist air specific heat may be used to further correct the ambient pressure correction $p_c$. In further embodiments, a dry air gas constant and a dry air specific heat may be used to correct ambient pressure correction $p_c$ instead, however.

In embodiments, method 300 may further include the step of correcting the airspeed measurement from the laser sensor to determine a longitudinal airspeed measurement corrected for at least one of a flow angle and a side-slip angle. As may be seen in aircraft measurement system 100 of FIG. 1, the longitudinal axis 120 of the aircraft is a principal axis of the aircraft body in the normal direction of flight, or the direction the pilot faces. Although a pitot probe may be relatively insensitive to flow angles in measuring the total pressure, LAMS measures the relative wind in a specific direction. For an airspeed measurement v measured with LAMS, a given flow angle $\theta$ relative to the laser beam 218 provides a longitudinal airspeed measurement $v_l = v \cos(\theta)$. The LAMS 200 laser beam 218 may be oriented close to but slightly offset from the longitudinal axis 120 of the aircraft, at a viewing angle $\theta_1$ above and a viewing angle $\theta_2$ to the starboard side of the longitudinal axis 120. There may also be a wind relative to an aircraft, side-slip $\beta$, which may be positive for a relative wind approaching from the starboard side of the aircraft. In embodiments, the pressure corrections made with Equations (4) and (5) may therefore be further corrected for orientation error by replacing airspeed measurement v with $v_l/\cos\theta$, with $\cos\theta = \cos(\theta_1 + \alpha)\cos(\theta_2 - \beta)$.

As described above, the ambient pressure correction $p_c$ and dynamic pressure correction $q_c$ may be determined directly using the LAMS and Equations (3) and (5). The uncertainty of airspeed $\delta v$ along the axis of a LAMS has been experimentally found to be approximately 0.1 m/s. The total derivative of Equation (2) may therefore provide a basis for evaluating the uncertainty in the value of q estimated from Equation (2):

$$\frac{\delta q}{p} = \left(\frac{v^2}{2c_p T} + 1\right)^{\frac{c_p}{R_a} - 1} \frac{v^2}{R_d T}\left(\frac{\delta v}{v} - \frac{1}{2}\frac{\Delta T}{T}\right) \quad (6)$$

Equation (6) demonstrates that temperature uncertainty $\Delta T$, may contribute significantly to uncertainty in dynamic pressure $\delta q$. For a typical measured airspeed v of 220 m/s and uncertainty of airspeed $\delta v$ of 0.1 m/s, $\delta v/v$ is 0.00045. For a typical operating temperature T of 223° C. and uncertainty in temperature $\Delta T$ of 0.3° C., however, $$\frac{1}{2}\frac{\Delta T}{T}$$

is 0.00067. Reducing the temperature uncertainty $\Delta T$ may therefore reduce uncertainty in dynamic pressure $\delta q$.

In embodiments, the LAMS airspeed measurement v may be used to further reduce the uncertainty in temperature $\Delta T$ from Equation (2) by correcting for dynamic heating. Temperature T may be estimated from:

$$T = T_r - \alpha_T \frac{v_l^2}{2c_p} \quad (7)$$

with $T_r$ being the measured or "recovery" temperature, and airspeed measurement being the longitudinal airspeed measurement $v_l$ corrected for orientation provided by LAMS instead of using a Mach number determined from conventional ambient pressure p and dynamic pressure q measurements.

The uncertainty in dynamic pressure $\delta q$ predicted using the LAMS may be determined using Equation (6) in flight. For example, a first set of flight conditions v=125 m/s, p=760 hPa and T=0° C. provide an uncertainty in dynamic pressure δq of approximately 0.13 hPa. The uncorrected error in ambient pressure $p_m$ using a pitot probe may be approximately 0.1 hPa. Applying a correction with the LAMS data may therefore result in an uncertainty in ambient pressure δp of 0.16 hPa. In a further example, a second set of flight conditions from a higher altitude v=235 m/s, p=150 hPa, and T=−60° C. result in a similar uncertainty in ambient pressure δp of 0.15 hPa. Therefore, in embodiments the use of LAMS to correct pressure data may lower the uncertainty of the longitudinal airspeed measurement $v_l$ to below 0.1 ms$^{-1}$ and lower the uncertainty in ambient pressure δp to less than 0.16 hPa.

In embodiments, method 300 may further include the steps of receiving a plurality of airspeed measurements corresponding to a plurality of total pressure measurements, calculating a plurality of ambient pressure corrections using the plurality of airspeed measurements and the plurality of total pressure measurements, and generating a numerical fit to the plurality of ambient pressure corrections. For example, a plurality of airspeed measurements v and a plurality of total pressure measurements $p_t$ may be received from the aircraft measuring system 100 including a LAMS 200 and a pitot probe 110 or 112, as described above. In embodiments, each respective airspeed measurement v may be acquired at substantially the same time as a total pressure measurement $p_t$. An ambient pressure correction $p_c$ may be determined for each respective airspeed measurement v and total pressure measurement $p_t$, as described above.

A numerical fit may be generated to the plurality of ambient pressure corrections $p_c$. A numerical fit, a curve fit, or a mathematical representation for the ambient pressure correction $p_c$, may account for flight characteristics such as flight level, angle of attack, Mach number, etc. Alternatively, a numerical fit may be applied when LAMS 200 data is not available. For example, a numerical fit may be applied if LAMS 200 does not detect enough signal to provide a valid airspeed measurement v. In embodiments, a numerical fit to the ambient pressure correction $p_c$ estimation may be applied retrospectively to data collected before LAMS data became available. In other embodiments, a numerical fit may be used to compare other methods for estimating ambient pressure corrections $p_c$. The numerical fit may in this way be used to smooth the fluctuations in the ambient pressure corrections $p_c$ that LAMS may detect from conditions present at the nose of an aircraft. An ambient pressure correction $p_c$ determined from the numerical fit may therefore be more accurate than an ambient pressure correction $p_c$ calculated directly using the LAMS airspeed $v_l$.

In embodiments, dependent variables may be used in a numerical fit to represent ambient pressure p, dynamic pressure q, Mach number M, angle of attack, side-slip β, airspeed v, and other characteristics of flight.

In an example, a numerical fit to pressure corrections calculated using Equation (5) may be determined using nearly continuously valid LAMS 200 data from flights including many altitude changes and speed variations. For example using a Gulfstream V aircraft, a numerical fit of the ambient pressure corrections Δp calculated using LAMS longitudinal airspeed measurement $v_l$ may be represented as:

$$\frac{\Delta p}{p} = a_0 + a_1 M^2 + a_2 M^3 + a_3 \frac{\Delta p_\alpha}{\Delta q_r} + a_4 \left(\frac{\Delta p_\alpha}{\Delta q_r}\right)^2 + a_5 \left(\frac{\Delta p_\alpha}{\Delta q_r}\right)^3 \quad (8)$$

where $\Delta p_\alpha$ is the pressure difference between vertically extreme pressure ports on an aircraft radome and $\Delta q_r$ is the pressure difference measured between a center port on the aircraft radome and a static source. The terms including $$\frac{\Delta p_\alpha}{\Delta q_r}$$

therefore represent the dependence of ambient pressure correction $p_c$ on angle-of-attack. Dimensionless coefficients $\{a_0, a_1, a_2, a_3, a_4, a_5\}$ for the best fit to the Δp estimations from a Gulfstream V flight may found to be, respectively, $\{-0.0134, 0.0426, -0.0718, -0.363, -3.62, -9.7\}$, with the quoted significant digits reflecting the standard error in determining the coefficients.

In embodiments, a least-significant term may be dropped from a numerical fit. In the Gulfstream V flight example, an analysis to determine the significance of each coefficient $\{a_0, a_1, a_2, a_3, a_4, a_5\}$ may be performed to fit the variance of the example ambient pressure correction $p_c$ estimation data to significance levels of less than 0.001. The correlation coefficient between the measured ambient pressure correction $p_c$ and the ambient pressure corrections $p_c$ predicted using Equation (8) was found to be 0.98 with a standard error of 0.00089 (i.e., 0.089% of a measured ambient pressure p, or about 0.3 hPa for a typical p=350 hPa). The standard error determined may reflect the scatter in individual measurements that arises when the LAMS 200 and other pressure-sensing instruments detect air parcels that are slightly displaced from each other so that they potentially measure different air motions.

In a Gulfstream V implementation example, the numerical fit for the pressure coefficients $\{a_0, a_1, a_2, a_3, a_4, a_5\}$ represented in Equation (8) was determined based on more than 10,000 measurements, with each measurement characterizing one second. In further embodiments, correlations among the measurements may extend over a time period of 10-100 s, however. The uncertainty in ambient pressure correction $p_c$ predictions estimated from a numerical fit was typically less than 0.03 hPa, at least 10-30 times smaller than the standard error using conventional instruments. The high correlation coefficient 0.98 indicates that the fit accounts for >96% of the variance between the predicted and measured ambient pressure corrections $p_c$. Because including additional functional dependence terms in Equation (8) does not reduce the residual variance beyond this limit, the remaining variance found between Equation (8) and the ambient pressure correction $p_c$ estimation data determined with LAMS 200 likely arises from real variance in airspeed between air parcels at a pressure sensing instrument vs. air parcels in the sample volume ahead of the LAMS 200.

Under the example Gulfstream V flight conditions, the LAMS measurements may indicate that the mean ambient pressure correction $p_c$ required is 3.5 hPa and the standard deviation for the ambient pressure correction is 1.45 hPa. If Equation (8) accounts for 96% of the variance in ambient pressure correction $p_c$, the remaining variance is equivalent to a residual standard deviation of less than 0.3 hPa. Because much of the variance in ambient pressure correction $p_c$ may arise from turbulent regions where the air volumes sampled by the LAMS and the pressure-sensing instrument are moving differently, the residual standard deviation of less than 0.3 hPa may be interpreted as an upper limit to the uncertainty in the ambient pressure correction $p_c$. Thus using the LAMS airspeed measurement v may therefore remove a 3.5 hPa error and reduce the residual uncertainty in ambient pressure correction $p_c$ to less than 0.3 hPa.

In the example implementation of Gulfstream V flight and numerical fit, the ratio of $\Delta p_\alpha/\Delta q_r$ from Equation (8) may range from about −0.2 to −0.03. In other embodiments including a Gulfstream V, a flight envelope may span a different range, however. Equation (8) includes a cubic term, $\Delta p_\alpha/\Delta q_r$, which may under some conditions extrapolate to erroneous corrections outside the cited range. In embodiments, other numerical fits may be developed to prevent such errors that may better extrapolate to conditions outside the cited range. For example the following term:

$$\frac{\Delta p}{p} = a'_0 + a'_1 \frac{q_m}{p_m} + a'_2 M^3 + a'_3 \frac{\Delta p_\alpha}{\Delta q_r} \quad (9)$$

may be applied with values for the coefficients $\{a'_0, a'_1, a'_2, a'_3\}$ respectively $\{-0.00071, 0.073, -0.0861, 0.0460\}$. The fit provided by Equation (9) to the LAMS ambient pressure corrections $p_c$ accounts for 95% of the variance of the correction, as opposed to the 96% provided by the fit of Equation (8). In embodiments, however, it may be desirable to use Equation (9) in cases where flight conditions fall outside the normal range of angle of attack used to determine the numerical fit of (8).

In an example implementation using a C-130 aircraft, the best fit of ambient pressure corrections $p_c$ obtained using LAMS 200 and Equation (5) was determined. For one pair of measurements of ambient pressure p and dynamic pressure q, the best numerical fit with all coefficients highly significant (significance level<0.001) was the following:

$$\frac{\Delta p}{p} = b_0 + b_1 \frac{\Delta p_\alpha}{\Delta q_r} + b_2 M + b_3 M^2 + b_4 M^3 + b_5 \frac{q}{p} + b_6 \frac{\Delta p_\beta}{\Delta q_r} \quad (10)$$

where $\Delta p_\beta$ is analogous to $\Delta p_\alpha$ but for the side-slip angle. The best-fit coefficients $\{b_0, b_1, b_2, b_3, b_4, b_5, b_6\}$ were found to be $\{-0.04165, 0.01485, 0.3730, -1.170, 0.9016, 0.2315, 0.002394\}$ with a standard error of 0.00042, corresponding to a pressure uncertainty at 700 hPa of about 0.3 hPa for the individual measurements. The second term, $$b_1 \frac{\Delta p_\alpha}{\Delta q_r},$$

provides the largest reduction in residual error, with a residual standard error of 0.00050. The least significant term is the last term, $$b_6 \frac{\Delta p_\beta}{\Delta q_r},$$

which only reduces the residual standard error by 0.000013 for a typical effect on pressure of 0.01 hPa. The second to last term, $$b_5 \frac{q}{p},$$

was found to have an insignificant effect on the residual error because the dependence on this term is already represented partially by a Mach-number variation. In embodiments, the parameterized representation of the ambient pressure corrections $p_c$ may be simplified by dropping either of the last two terms from Equation (10). In further embodiments, any combination of least significant terms may be dropped when representing an ambient pressure correction $p_c$ with a numerical fit.

In an embodiment, the first three terms of Equation (10), $$b_0 + b_1 \frac{\Delta p_\alpha}{\Delta q_r} + b_2 M,$$

may provide an adequate and simple fit, with a residual standard error of 0.00044, a typical additional error contribution to the corrected pressure of 0.014 hPa, insignificant in comparison to other expected error sources. The best-fit coefficients $\{b'_0, b'_1, b'_2\}$ in the example C-130 implementation were found to be $\{0.00163, 0.0214, 0.0145\}$. While the residuals from this fit may be small, the numerical fit produces a mean offset of approximately 2 hPa. The effect of the numerical fit on measurements of ambient pressure p and dynamic pressure q for this example may be significant.

In embodiments, method 300 may further include the step of calculating a parameterized representation of the ambient pressure correction $p_c$ that results from a numerical fit to the corrections measured by the LAMS 200.

As may be seen from the Gulfstream V and C-130 examples, the use of LAMS 200 measurements may reduce the uncertainty in measurements of ambient pressure p and dynamic pressure q to around 0.15 hPa. Even when the LAMS 200 is not present, using a parametric fit of pressure correction data may reduce the uncertainty in pressure to less than 0.3 hPa.

In embodiments, pressure corrections estimated using the LAMS may be verified using wind measurements in reverse-heading maneuvers. A reverse-heading maneuver is one in which a straight-and-level flight leg is flown for a short time, for example 2-5 minutes, after which the aircraft reverses course to fly the same leg in the opposite direction. One flight leg is often flown substantially concurrent with a wind direction and the other flight leg is flown substantially against the wind direction. If the measurement of dynamic pressure q is accurate, the longitudinal component of the wind will substantially reverse direction but have the same magnitude in reverse-heading maneuvers when the aircraft is flown over the same (drifting) flight leg twice with opposite headings. To isolate the effect of the measurement of q, and hence true airspeed, the best wind component to use is the wind component along the axis of the aircraft, or $v_g \cos \delta - v_t$ where $v_g$ is the ground speed of the aircraft, $v_t$ is the true airspeed relative to the air, and $\delta$ is the angle between the ground-speed vector and the heading of the aircraft. A GPS system may provide the ground-speed magnitude $v_g$ and the ground track angle $\Phi$, so $\delta = \Phi - \Psi$ where $\Psi$ is the heading of the aircraft. The wind component along the longitudinal axis of the aircraft, $v_x$, is therefore:

$$v_x = v_g \cos(\Phi - \Psi) - v_t \quad (11)$$

where $v_t$ may be provided directly from LAMS or from the corrected dynamic pressure via Equation (8) for a Gulfstream V or Equations (9) and (10) for a C-130. The longitudinal component of the wind $v_x$ given by Equation (11) should substantially reverse sign between the two legs of the reverse-heading maneuver. Within the statistical variability imposed by atmospheric fluctuations, a comparison of $v_x$ measured for each leg may therefore validate the longitudinal component of the wind measurements made in flight.

In an embodiment, ambient pressure corrections $p_c$ estimated using the LAMS may be further verified using an avionics pressure system. For example, the ambient pressure measurement from a avionics system found on a Gulfstream V that is certified to fly on Reduced Vertical Separation Minimum (RVSM) levels as defined by the Federal Aviation Administration may be more reliable than those found on other aircraft.

In a further embodiment, dependence on Mach number may be used to verify the validity of ambient pressure corrections $p_c$ estimated using the LAMS 200. The dominant dependence in the ambient pressure correction $p_c$ represented in Equation (8) is that on Mach number M, which is dependent on airspeed measurement v. An aircraft may be flow in level flight while varying airspeed v in any range between a low-speed limit and a high-speed limit to determine a Mach number profile. If the LAMS ambient pressure corrections $p_c$ are adequate, varying the flight speed v should not introduce perturbations into the measured pressure fields.

In embodiments, method 300 may include the further steps of receiving an independent airspeed measurement, calculating a corrected static pressure using the correct ambient pressure and the total pressure measurement, and calculating a corrected airspeed using the corrected ambient pressure, the corrected static pressure, and the independent airspeed. An independent airspeed measurement may be provided by any atmospheric instrument typically used by those of skill in the art.

While the LAMS may provide a direct measurement of measured airspeed v, it may be further useful to use LAMS to produce a correction for measured airspeed v. As described above, the ambient pressure correction $p_c$ and dynamic pressure correction $q_c$ determined using LAMS may be used to determine a corrected ambient pressure p and a corrected dynamic pressure q. Using the LAMS-corrected ambient pressure p and LAMS-corrected dynamic pressure q, a calculated airspeed v may be determined by solving Equation (2) for calculated airspeed v as a function of corrected ambient pressure p and corrected dynamic pressure q. Because the volume of air in which LAMS 200 determines a measured airspeed v may be displaced from the radome of the aircraft, where conventional pressure sensing instruments are located, the calculated airspeed v determined using corrected ambient pressure p and corrected dynamic pressure q may differ slightly from the LAMS-measured airspeed v. In the example of a Gulfstream V, the difference between the measured airspeed v using LAMS and the calculated airspeed v determined using the corrected ambient pressure p and corrected dynamic pressure q has been found to have a standard deviation of 0.35 m/s. Estimates based on measured turbulence levels indicate that a standard deviation of 0.35 m/s is similar to that expected for sample locations separated by about 16 m, the distance between the LAMS sensing volume and the nose of a Gulfstream V. For this reason, it may at times be preferable to use an airspeed based on ambient pressure correction $p_c$ and dynamic pressure correction $q_c$ to determine the wind, even when LAMS 200 is present.

In the example of a Gulfstream V, the mean correction in measured airspeed v calculated with LAMS 200 has been found to be −0.8 m/s. The standard error in the calculated airspeed v using LAMS is much smaller than the 0.1 m/s uncertainty in the measured airspeed v from LAMS alone. A calibration using LAMS may therefore remove a −0.8 m/s error, reducing the uncertainty in airspeed to less than 0.1 m/s. In the example of a C-130 aircraft, the corresponding mean airspeed correction is +0.5 m/s. In embodiments, calculated airspeed v may be further combined with measurements from a GPS and an inertial reference system (IRS) to estimate wind with an uncertainty of approximately 0.1 m/s. Calibrating airspeed using LAMS may therefore reduce the uncertainty in the component of the wind along the aircraft axis to less than 0.2 m/s.

It may also be possible to verify the calibration of a temperature sensor using a corrected ambient pressure p or corrected dynamic pressure q with the LAMS instrument. Using the highly accurate LAMS-corrected pressure measurement and an accurate geometric altitude provided by a GPS, the hydrostatic equilibrium equation may be integrated to calculate height differences which may be compared to measured height differences. Highly accurate geometric altitude may be provided by GPS. The improved accuracy in the measurement of pressure provided by LAMS may serve to reduce the uncertainty in the measurement of pressure differences and enables a more stringent test of the validity of the measurements of temperature.

In a further embodiment of method 300, additional steps may be performed. For example, a first corrected ambient pressure may be calculated using the ambient pressure measured with the aircraft instrument and the ambient pressure correction at a first altitude, and a second corrected ambient pressure may be calculated using the ambient pressure measured with the aircraft instrument and the ambient pressure correction at a second altitude. A height may be further received between the first altitude and the second altitude, and a calculated temperature may be calculated using the first corrected ambient pressure, the second ambient corrected pressure, and the height between the first altitude and the second altitude. The height may be determined by differencing the first altitude and the second altitude. In embodiments, the first and second altitudes may be determined by a GPS, or by any other instrument capable of providing an accurate geometric altitude z, as will be known to those of skill in the art.

In embodiments, the calculated temperature may be determined using the hydrostatic equation:

$$\delta p_i = -\frac{gp_i}{R_a T_i} \delta z_i \qquad (12)$$

where $\{p_i, T_i\}$ are the values of ambient pressure p and absolute temperature T for the i-th measurement and $\delta p_i$ is the change in ambient pressure for the i-th step, during which the geometric altitude z changes by $\delta z_i$. Equation (12) may be rearranged to obtain an estimate of the temperature T:

$$T_i = -\frac{g}{R_a} \frac{\delta z_i}{\delta \ln p_i} \qquad (13)$$

In order to obtain an uncertainty of 0.1% in derived temperature T, for example a typical uncertainty in temperature is 0.3° C., an accuracy of at least 0.1% is required in the measurement of geometric altitude z, which may be easily obtained using differential GPS over geometric altitude intervals δz as small as 10 m. The requirement is more stringent on the measurement of ambient pressure p. Using 1 s measurement intervals during a 10 m/s aircraft climb, the ambient pressure change δp may be less than 1 hPa, with a measurement uncertainty 0.1 hPa, which could potentially introduce an error of 10% into the calculated temperature T. A 10% error in calculated temperature T is undesirable. Therefore, in embodiments larger ambient pressure differences δp or the average of many ambient pressure measurements may be used to obtain a useful calculated temperature T.

In an example implementation, LAMS 200 was operated on a C-130 aircraft. For a 30 min flight, the C-130 performed repeated climbs and descents that included about 1800 measurements of ambient pressure p and geometric altitude z. In the implementation, the standard error in the calculated temperature T determined using Equation (13) for 1800 measurements is reduced by $\sqrt{1800}=42$, or to around 0.5° C.

In a further embodiment of method 300, additional steps may be performed. For example, a plurality of sensor temperatures may be received, each respective sensor temperature of the plurality of sensor temperatures corresponding to a respective measured altitude of a plurality of measured altitudes. A plurality of total pressure measurements from the aircraft instrument may be further received, each total pressure measurement of the plurality of total pressure measurements corresponding to a respective measured altitude of the plurality of measured altitudes. A plurality of corrected ambient pressures may be further calculated corresponding to the plurality of total pressure measurements and the plurality of corresponding ambient pressure corrections at each of the plurality of measured altitudes. A mean temperature may be further calculated using the plurality of corrected ambient pressures and the plurality of measured altitudes. Finally, a temperature sensor may be validated using the mean temperature. For example, temperature sensor 122 may be validated.

A sensor temperature may be received from any type of sensor capable of detecting an atmospheric temperature commonly known to those of skill in the art. The measured altitudes, total pressure measurements, and corrected ambient pressures may be determined using techniques described above.

A mean temperature is a temperature between two altitude levels. In an example embodiment, a mean temperature may be determined using Equation (13). For example, aircraft 102 may perform repeated climbs from the approximate altitudes of 12000-16000 ft over a pressure range of approximately 100 hPa. An ambient pressure uncertainty of 0.1 hPa over an ambient pressure change δp 100-hPa may provide an uncertainty in absolute temperature T of 0.1%, or an uncertainty in mean temperature of about 0.3° C. between the altitude levels. In this example flight, it may therefore be possible to validate sensor temperatures received to a level of 0.3° C. temperature uncertainty.

In an embodiment, mean temperature may be calculated using three sums between different flight levels:

$$S_1 = \Sigma_i \frac{R_{a,i}}{g_i} \ln\left(\frac{p_i}{p_i - 1}\right) \tag{14}$$

$$S_2 = \Sigma_i (z_i - z_{i-1}) \tag{15}$$

$$S_3 = \Sigma_i \frac{z_i - z_{i-1}}{T_{m,i}} \tag{16}$$

where $R_{a,i}$ and g are respectively the gas constant (adjusted for humidity) and the acceleration of gravity (adjusted for latitude and altitude) and $T_{m,i}$ is the measured temperature in absolute units, corrected for airspeed v but based on the standard sensors being tested. The predicted mean temperature for the layer, weighted by altitude, is given by $T_p = S_2/S_1$, while the corresponding weighted-mean measured temperature is $T_m = S_2/S_3$. The sensor temperature may therefore be validated by comparing the sensor temperature, or $T_m$ to the mean temperature, or $T_p$.

In embodiments, a temperature sensor may be validated using numerical fit and a time series, or a temporal sequence of data points determined during a flight. Conveniently, this may allow temperature sensor 122 to be validated using a wider range of calibration points taken along a larger range of altitude changes. In embodiments, the numerical fit may be determined by applying a polynomial correction that includes minimizing the error between measured altitude changes determined using an independent instrument such as a GPS, and calculated altitudes predicted via integration of the hydrostatic equation. The chi-square ($\chi^2$) to be minimized is:

$$\chi^2 = \Sigma_i \frac{1}{\sigma_z^2}(h_i - Z_i)^2 \tag{17}$$

where $Z_i$ is the measured altitude, $\sigma_z$ is the uncertainty in the altitude measurement, and the calculated altitude $h_i$ was determined by integration of the hydrostatic equation in the form:

$$h_i = h_{i-1} - \frac{R_a(f(T_i))}{g} \ln \frac{p_i}{p_{i-1}} \tag{18}$$

$$f(T_i) = \frac{(c_0 + (1 + c_1)T_i + T_0)}{1 + \alpha T \frac{R_a}{2C_v} M^2} \tag{19}$$

where $c_0$ and $c_1$ are coefficients to be found by minimization of Equation (17). In Equations (18) and (19), $R_a$ is the moist-air gas constant, g the acceleration of gravity (adjusted for latitude and altitude), and $\{p_i\}$ is the time sequence of measured ambient pressures p. The function $f(T_i)$ allows the adjustable coefficients $c_0$ and $c_1$ to be applied to the calculated temperature $T_i$, with conversion to ambient temperature on the basis of the recovery factor ($\alpha$), the Mach number (M) and the specific heat at constant volume ($c_v$). The calculated temperature $T_i$ is converted to an absolute temperature with the addition of $T_0=273.15$ K.

In a further embodiment of method 300, the steps described with regards to Equations (17), (18), and (19) may be further included. For example, a time series of corrected ambient pressure values may be calculated, each corrected ambient pressure value of the time series of corrected ambient pressure values corresponding to a measured altitude of a plurality of measured altitudes. A time series of calculated altitudes may further be calculated using the time series of corrected ambient pressure values. A numerical fit to the time series of corrected ambient pressure values may be generated by minimizing the difference between the plurality of measured altitudes and the time series of calculated altitudes. A calculated temperature may be calculated using the numerical fit. Finally, a sensor temperature may be received, and the calculated temperature may be compared to the sensor temperature to validate temperature sensor 122.

When an aircraft performs climbs and descents in a manner that spans sufficient horizontal distance, the vertical integration may match the ambient pressure change only if the atmosphere is horizontally homogeneous. If the atmosphere is not horizontally homogeneous, the results may be biased as the numerical fit attempts to compensate for horizontal gradients, introducing error into the minimization results. Therefore, in embodiments each corrected ambient pressure of the time series of corrected ambient pressure values may be calibrated for a horizontal pressure gradient. The horizontal pressure gradient $G_p$ along the flight path is $d_p/d_s = G_p$. There may also be a contribution to the ambient pressure p change arising just from the pressure gradient over a period $\Delta t$ of magnitude $G_p v \Delta t$, however. In embodiments, Equation (18) may therefore be modified so that the pressure ratio $$\frac{p_i}{p_{i-1}}$$

is changed to $$\frac{p_i - G_p v_i \Delta t}{p_{i-1}}.$$

It may be useful to further define a d-value, or the difference between geometric altitude and pressure altitude. The change in d-value during a climb results from a first part, a horizontal pressure gradient, and a second part, a climb in an atmosphere that differs from a standard atmosphere. The expected change in the measurement of d-value $d_i$ is then:

$$d_i - d_{i-1} = -\left(\frac{R_a(f(T_i))}{g} - \frac{R_s T_s(p)}{g_s}\right) \ln \frac{p_i}{p_{i-1}} - \frac{G_p R_a T_i v_i \Delta t}{g p_i} \quad (20)$$

where $R_s$ is a gas constant, $g_s$ is the acceleration of gravity defined in the definition of the U.S. standard atmosphere, and $T_s(p)$ is the absolute temperature corresponding in the standard atmosphere to atmospheric pressure p. In Equation (20), the $$-\left(\frac{R_a(f(T_i))}{g} - \frac{R_s T_s(p)}{g_s}\right) \ln \frac{p_i}{p_{i-1}}$$

term relates to the climb or descent and the $$\frac{G_p R_a T_i v_i \Delta t}{g p_i}$$

term relates to the horizontal pressure gradient. The horizontal pressure gradient $G_p$ may then be deduced from the measurements of d-value by rearranging (20):

$$G_p v_i \Delta t = \frac{g p_i}{R_a v_i} \left\{ -\left(\frac{R_a(f(T_i))}{g} - \frac{R_s T_s(p_i)}{g_s}\right) \ln \frac{p_i}{p_{i-1}} - (d_i - d_{i-1}) \right\} \quad (21)$$

Then, the altitude-change equation (18) may be replaced by:

$$h_i = h_{i-1} - \frac{R_a(f(T_i))}{g} \ln\left(\frac{p_i - G_p v_i \Delta t}{p_{i-1}}\right) \quad (22)$$

Figure 4:
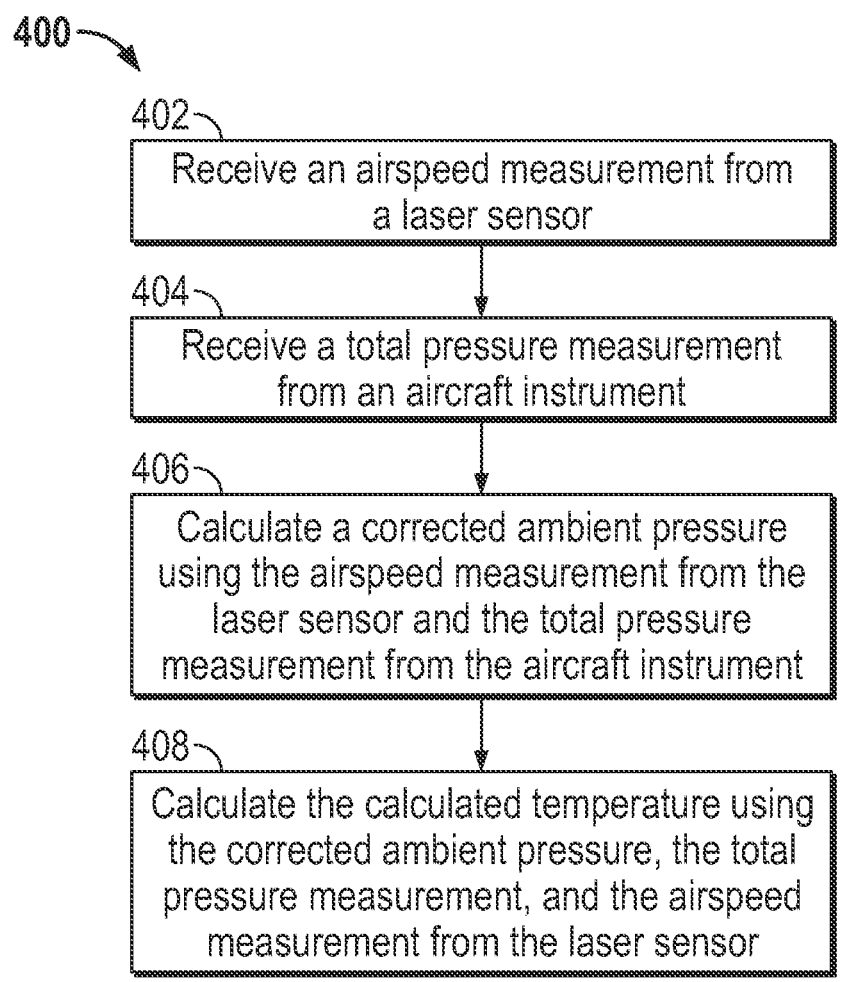
FIG. 4 depicts a method 400, in accordance with an embodiment of the Application.

FIG. 4 depicts a method 400 for calculating a calculated temperature outside an aircraft, in accordance with an embodiment. The calculated temperature may be used as an independent temperature indication, or to validate the accuracy of other temperature sensors.

Method 400 begins with step 402. In step 402, an airspeed measurement is received from a laser sensor. For example, airspeed measurement v may be received from LAMS 200, as described above.

Method 400 continues with step 404. In step 404, a total pressure measurement is received from an aircraft instrument. For example total pressure $p_t$ may be received from an aircraft instrument that includes a pitot probe 110, 112 and a pressure transducer, as described above.

Method 400 continues with step 406. In step 406, a corrected ambient pressure is calculated using the airspeed measurement from the laser sensor and the total pressure measurement from the spacecraft instrument. For example, corrected ambient pressure p may be calculated using airspeed measurement v from the LAMS 200, as described above.

Method 400 continues with step 408. In step 408, the calculated temperature is calculated using the corrected ambient pressure, the total pressure measurement, and the airspeed measurement from the laser sensor. As discussed above, the LAMS 200 may provide a direct measurement of the measured airspeed v or the longitudinal measured airspeed $v_l$. In addition, the LAMS 200 also enables the calculation of pressure corrections that improve independent measurements of ambient pressure p and dynamic pressure q. Using the measured airspeed v and corrected ambient pressure p, it is possible to determine the Mach number M. An equation for calculated temperature T may therefore be obtained from Equation (2) rewritten in the form:

$$T = \frac{v^2}{2C_p\left[\left(\frac{p_t}{p}\right)^{R_a/c_p} - 1\right]} \quad (23)$$

In embodiments, the longitudinal measured airspeed $v_l$ may be used to determine a calculated temperature T instead of the measured airspeed v. Measured airspeed v or $v_l$, ambient pressure p and total pressure $p_t$ may therefore be used to determine the calculated temperature T independent of other aircraft temperature sensors.

In embodiments, method 400 may further include the step of correcting the airspeed measurement from the laser sensor to determine a longitudinal airspeed measurement corrected for at least one of a flow angle and a side-slip angle, as described above.

In embodiments, method 400 may further comprise the steps of receiving a sensor temperature and comparing the calculated temperature to the sensor temperature to validate a temperature sensor. For example, calculated temperature T may be determined using Equation (23) and compared to a sensor temperature. If the sensor temperature is within a specified range of the calculated temperature, the temperature sensor may be deemed to be valid. If the sensor temperature is outside a specified range of the calculated temperature, however, the temperature sensor may be deemed to be providing an invalid sensor temperature.

In practice, the standard deviation in the difference between the calculated temperature T using LAMS 200 and a temperature measured using an independent temperature sensor may be much greater than the actual difference between the calculated temperature and the sensor temperature. The proportionately large standard deviation may arise from regions of significant turbulence. For example, larger errors may arise when the sample volumes represented by each of the dynamic pressure q and the airspeed measurement $v_l$ are different. In addition, the calculated temperature T determined using the LAMS 200 may also be nosier than the temperature measured with a temperature sensor. In particular, the variance may be higher in the LAMS 200—determined calculated temperature T for the flight segment in the boundary layer (near 2100Z) because the flow conditions at the pitot probe and in the air sampled by LAMS 200 tend to have lower coherence at high rate, leading to a noisier estimate of the temperature.

In embodiments, method 400 may further comprise the step of providing the calculated temperature when a sensor temperature is not available. Advantageously, the calculated temperature T may then serve as a backup for other independent temperature sensors onboard an aircraft. The calculate temperature T is valuable because miscalibration and other changes in conventional temperature sensors may cause discrepancies in conventional probe temperatures. The calculated temperature T determined using LAMS 200 may also continue to provide valid temperature data in clouds where conventional immersion sensors may become wet and, in the dynamically heated airflow, experience wet-bulb cooling. In clouds, however, backscatter from the cloud particles may continue to provide a very strong detected laser beam 118 that may be detected with LAMS 200. In such circumstances, LAMS 200 may continue to provide a valid calculated temperature T when conventional temperature sensors cannot provide valid data. Advantageously, this feature enables LAMS 200 to provide important information on the buoyancy of clouds and entrainment via mixing.

Commercial airliners and other high-altitude aircraft have occasionally encountered flight conditions that cause their conventional pitot airspeed indicators to become inoperative. While this may occur as a result of normal icing, the more serious events have arisen in cloud regions where there is a particularly high concentration of small ice crystals. It is believed that these ice crystals accumulate so as to block airflow to the pitot airspeed sensor. The same phenomenon may also affect temperature sensors. Because most commercial and high-altitude aircraft are flown under the control of flight management systems, the incorrect data fed to those systems may cause the flight management systems to malfunction. The loss of airspeed information may be particularly troublesome to pilots, who rely on this information to keep the aircraft in a safe flight envelope. Because of the importance of these systems to flight safety, alternatives to conventional airspeed indicators that provide reliable measurements are highly desired.

Returning to FIG. 2, it may be seen that in embodiments, LAMS 200 may include heater 224. Heater 224 is connected to window 214. Heater 224 is operable to melt ice crystals that build up on window 214, protecting the optical window 214 from coverage by ice. In embodiments, heater 224 may provide heat to window 214 via thermal contact. Advantageously, heater 224 may permit LAMS 200 to support continuous airspeed measurements, pressure corrections, calculated temperatures, or other measurement that LAMS 200 is capable of supporting, while an aircraft is flying through clouds.

In further embodiments, airflow control to window 214 may be used to partially or completely shield window 214 of LAMS 200 from the impact of ice particles.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Application. It will also be apparent to those of ordinary skill in the art that the above-described embodiments may be combined in whole or in part to create additional embodiments within the scope and teachings of the Application.

Thus, although specific embodiments of, and examples for, the Application are described herein for illustrative purposes, various equivalent modifications are possible within the scope of the Application, as those skilled in the relevant art will recognize. The teachings provided herein may be applied to other precipitation measurement systems, and not just to the embodiments described above and shown in the accompanying figures. Accordingly, the scope of the Application should be determined from the following claims.

We claim:

1. A method for correcting an ambient pressure measurement outside an aircraft, comprising the steps of:
receiving an airspeed measurement v from a laser sensor;
receiving an ambient pressure measurement from a first sensor, the first sensor being an absolute transducer in fluid communication with a static port;
calculating an ambient pressure correction $p_c$ or the first sensor using the airspeed measurement v from the laser sensor and the ambient pressure measurement $p_m$ from the absolute transducer, where the ambient pressure correction $$p_c = \frac{q_m - p_m \chi}{1 + \chi},$$

where $$\chi(v, T) = \left(\frac{v^2}{2c_p T} - 1\right)^{c_v/R_a} - 1,$$

$q_m$ is a dynamic pressure measurement, T is a temperature, $c_v$ is a respective specific heat of air at constant volume, and $R_a$ is a gas constant for air; and
calculating a corrected ambient pressure using the ambient pressure measurement $p_m$ and the ambient pressure correction $p_c$, wherein the ambient pressure correction $p_c$ corrects for a flow angle with respect to the static port.

2. The method of claim 1, wherein the ambient pressure measurement is determined using a transducer.

3. The method of claim 1, further comprising the steps of:
receiving a plurality of airspeed measurements corresponding to a plurality of total pressure measurements;

calculating a plurality of ambient pressure corrections $p_c$ using the plurality of airspeed measurements and the plurality of total pressure measurements $p_c$; and generating a numerical fit to the plurality of ambient pressure corrections $p_c$.

4. The method of claim 3, further comprising the step of:
calculating an interpolated ambient pressure correction using the numerical fit.

5. The method of claim 1, further comprising the step of:
correcting the airspeed measurement v from the laser sensor to determine a longitudinal airspeed measurement corrected for a side-slip angle.

6. The method of claim 1, further comprising the step of:
receiving an independent airspeed measurement; calculating a corrected dynamic pressure using the corrected ambient pressure and a total pressure measurement; and
calculating a corrected airspeed using the corrected ambient pressure, the corrected dynamic pressure, and the independent airspeed measurement.

7. The method of claim 1, further comprising the steps of:
calculating a first corrected ambient pressure using the ambient pressure measurement and the ambient pressure correction $p_c$ at a first altitude;
calculating a second corrected ambient pressure using the ambient pressure measurement and the ambient pressure correction $p_c$ at a second altitude;
receiving a height between the first altitude and the second altitude; and
calculating a calculated temperature using the first corrected ambient pressure, the second ambient corrected pressure, and the height between the first altitude and the second altitude.

8. The method of claim 1, further comprising the steps of:
receiving a plurality of sensor temperatures, each respective sensor temperature of the plurality of sensor temperatures corresponding to a respective measured altitude of a plurality of measured altitudes;
receiving a plurality of total pressure measurements from the aircraft instrument, each total pressure measurement of the plurality of total pressure measurements corresponding to a respective measured altitude of the plurality of measured altitudes;
calculating a plurality of corrected ambient pressures corresponding to the plurality of total pressure measurements and the plurality of corresponding ambient pressure corrections $p_c$ at each of the plurality of measured altitudes; calculating a mean temperature using the plurality of corrected ambient pressures and the plurality of measured altitudes; and
validating a temperature sensor using the mean temperature.

9. The method of claim 1, further comprising the steps of:
calculating a time series of corrected ambient pressure values, each corrected ambient pressure value of the time series of corrected ambient pressure values corresponding to a measured altitude of a plurality of measured altitudes;
calculating a time series of calculated altitudes using the time series of corrected ambient pressure values;
generating a numerical fit to the time series of corrected ambient pressure values by minimizing the difference between the plurality of measured altitudes and the time series of calculated altitudes;
calculating a calculated temperature using the numerical fit;
receiving a sensor temperature; and comparing the calculated temperature to the sensor temperature to validate a temperature sensor.

10. The method of claim 9, wherein each corrected ambient pressure of the time series of corrected ambient pressure values is calibrated for a horizontal pressure gradient.

11. A method for calculating a calculated temperature outside an aircraft, comprising the steps of:
receiving an airspeed measurement v from a laser sensor;
receiving an ambient pressure measurement $p_m$ from a first sensor, the first sensor being an absolute transducer in fluid communication with a static port;
calculating an ambient pressure correction $p_c$ for the first sensor using the airspeed measurement v from the laser sensor and the ambient pressure measurement $p_m$ from the absolute transducer, where the ambient pressure correction $$p_c = \frac{q_m - p_m \chi}{1 + \chi}, \text{ where } \chi(v, T) = \left(\frac{v^2}{2c_pT} - 1\right)^{c_v/R_a} - 1,$$

$q_m$ is a dynamic pressure measurement, T is a temperature, $c_v$ is a respective specific heat of air at constant volume, and $R_a$ is a gas constant for air;
calculating a corrected ambient pressure using the ambient pressure measurement $p_m$ and the ambient pressure correction $p_c$, wherein the ambient pressure correction $p_c$ corrects for a flow angle with respect to the static port;
receiving a total pressure measurement; and
calculating the calculated temperature using the corrected ambient pressure, the total pressure measurement, and the airspeed measurement v from the laser sensor.

12. The method of claim 11, further comprising the step of:
correcting the airspeed measurement v from the laser sensor to determine a longitudinal airspeed measurement corrected for a side-slip angle.

13. The method of claim 11, further comprising the steps of:
receiving a sensor temperature; and
comparing the calculated temperature to the sensor temperature to validate a temperature sensor.

14. The method of claim 11, further comprising the step of:
providing the calculated temperature when a sensor temperature is not available.

15. An apparatus for calculating a calculated temperature in flight, comprising:
a laser sensor configured to provide an airspeed measurement v;
a first aircraft instrument configured to provide an ambient pressure measurement $p_m$, the first aircraft instrument being an absolute transducer in fluid communication with a static port; and
a processing system usable to calculate an ambient pressure correction $p_c$ for the first sensor using the airspeed measurement v from the laser sensor and the ambient pressure measurement $p_m$ from the absolute transducer, where the ambient pressure correction $$p_c = \frac{q_m - p_m \chi}{1 + \chi}, \text{ where } \chi(v, T) = \left(\frac{v^2}{2c_pT} - 1\right)^{c_v/R_a} - 1,$$

$q_m$ is a dynamic pressure measurement, T is a temperature, $c_v$ is a respective specific heat of air at constant volume, and $R_a$ is a gas constant for air; and calculate a corrected ambient pressure using the ambient pressure measurement $p_m$ and the ambient pressure correction $p_c$, wherein the ambient pressure correction $p_c$ corrects for a flow angle with respect to the static port.

16. The apparatus of claim 15, further comprising:
a temperature sensor, wherein the processing system is usable to verify a sensor temperature by comparing the calculated temperature to the measured temperature.

17. The apparatus of claim 16, wherein the processing system is further able to provide the calculated temperature when the sensor temperature is not available.

18. The apparatus of claim 15, wherein the laser sensor further includes an optical window in thermal contact with a heater.

* * * * *